United States Patent
Balatchev et al.

(10) Patent No.: US 9,621,965 B2
(45) Date of Patent: Apr. 11, 2017

(54) MODULE, CIRCUIT AND METHOD OF COMMUNICATION FOR DETECTION DEVICE AND SENSOR COMPRISING SUCH A MODULE, IN PARTICULAR FOR EXPLOSIVE ATMOSPHERE

(71) Applicant: TTK, Trappes (FR)

(72) Inventors: Stefan Balatchev, Ottawa (CA);
Olivier Gillot, Neuilly sur Seine (FR)

(73) Assignee: TTK, Paris (FR)

( * ) Notice: Subject to any disclaimer, the term of this patent is extended or adjusted under 35 U.S.C. 154(b) by 0 days.

(21) Appl. No.: 14/646,234

(22) PCT Filed: Nov. 28, 2013

(86) PCT No.: PCT/EP2013/074966
§ 371 (c)(1),
(2) Date: May 20, 2015

(87) PCT Pub. No.: WO2014/083104
PCT Pub. Date: Jun. 5, 2014

(65) Prior Publication Data
US 2016/0156996 A1  Jun. 2, 2016

(30) Foreign Application Priority Data

Nov. 28, 2012 (FR) ..................................... 12 61349

(51) Int. Cl.
*H02J 5/00* (2016.01)
*H01L 41/113* (2006.01)
(Continued)

(52) U.S. Cl.
CPC .............. *H04Q 9/00* (2013.01); *E03B 7/071* (2013.01); *F17D 5/06* (2013.01); *G01M 3/165* (2013.01);
(Continued)

(58) Field of Classification Search
CPC . E03B 7/12; E03B 7/071; G08B 21/18; F17D 5/06; G01M 3/165; H04Q 2209/883;
(Continued)

(56) References Cited

U.S. PATENT DOCUMENTS

| | | | |
|---|---|---|---|
| 4,339,723 A | 7/1982 | Yee | |
| 4,807,149 A | 2/1989 | Mehnert | |

(Continued)

FOREIGN PATENT DOCUMENTS

| | | |
|---|---|---|
| DE | 199 59 710 | 6/2001 |
| EP | 2 330 397 | 6/2011 |
| FR | 2 761 154 | 9/1998 |

*Primary Examiner* — Dionne H Pendleton
(74) *Attorney, Agent, or Firm* — Greer, Burns & Crain, Ltd.

(57) ABSTRACT

A communication module is provided for a sensor, for use in a detection device, including a plurality of sensors, having at least one upstream receiver for receiving an interrogation signal from upstream of the sensor and transporting it to the sensor, and receiving from the sensor a response signal and transporting it upstream of the sensor; —at least one downstream transporter for transporting an interrogation signal downstream of the sensor; —at least one sensor short-circuit, displaceable between an open position wherein the upstream receiver is linked to the sensor, and a closed position in which the upstream receiver is disconnected from the sensor and connected to the downstream transporter; and —at least one controller, for controlling the sensor short-circuit and arranged to maintain the sensor short-circuit: —in the open position until the emission of the response signal, and —in the closed position after the emission.

17 Claims, 3 Drawing Sheets

(51) Int. Cl.
*H04Q 9/00* (2006.01)
*E03B 7/07* (2006.01)
*F17D 5/06* (2006.01)
*G01M 3/16* (2006.01)

(52) U.S. Cl.
CPC ..... *H04Q 2209/43* (2013.01); *H04Q 2209/47* (2013.01); *H04Q 2209/883* (2013.01)

(58) Field of Classification Search
CPC  H04Q 9/00; F16K 31/02; F16K 31/05; Y10T 137/8158
See application file for complete search history.

(56) References Cited

U.S. PATENT DOCUMENTS

| | | | |
|---|---|---|---|
| 2008/0042518 A1* | 2/2008 | Liu | H01H 59/0009 310/319 |
| 2008/0319688 A1* | 12/2008 | Kim | H04Q 9/00 702/51 |
| 2011/0114202 A1* | 5/2011 | Goseco | E03B 7/04 137/487.5 |
| 2012/0032811 A1 | 2/2012 | Lee | |
| 2015/0116118 A1* | 4/2015 | Yu | G08B 25/009 340/605 |
| 2016/0064948 A1* | 3/2016 | Heresztyn | H02J 50/80 307/104 |

\* cited by examiner

_MODULE, CIRCUIT AND METHOD OF COMMUNICATION FOR DETECTION DEVICE AND SENSOR COMPRISING SUCH A MODULE, IN PARTICULAR FOR EXPLOSIVE ATMOSPHERE_

BACKGROUND

The invention relates to a communication module with a sensor of a detection device comprising a plurality of sensors arranged in series. It also relates to a communication circuit comprising such communication modules, a sensor comprising such a communication module. It also relates to a detection device comprising such sensors or communication circuit and a method of communication implemented in such a device.

The field of the invention is the field of detection devices comprising a plurality of sensors arranged for detecting/measuring an event or a physical variable, and more particularly of devices for detecting leakage, for example of liquids of water or hydrocarbon type etc., in particular in zones with a dangerous or even explosive atmosphere, known as "ATEX zones" (for ATmosphère EXplosive [explosive atmosphere]).

There are currently numerous solutions for the detection of leakage of liquids such as leakages of water or hydrocarbons. These solutions utilize an electronic and/or computerized supervision device linked, via a cable, referred to as a detection cable, to one or more sensors arranged along this cable. The detection cable, via two wires, transports an electric signal for supplying the different sensors, provided by a supply module which can be incorporated into the supervision device. The detection cable, via one or more wires, also transports a communication signal between the supervision device and each of the sensors.

The longer the detection cable, the more powerful the electric communication signal emitted by the supervision device, for ensuring good communication with all the sensors, including the sensor situated furthest away, and avoiding parasitic energy and parasitic reactances.

Now, the increase in power of the communication signal is dangerous for ATEX zones because high-power signals can cause explosions due to the energy released through the Joule effect. This is why the power of the signals used is limited for the ATEX zones and monitored by barrier devices called "Zener barriers" positioned between the electronic supervision device and the detection cable. The limitation of the power of the communication signals has the consequence of limiting the length of the detection cable.

A purpose of the invention is to overcome the abovementioned drawbacks.

Another purpose of the invention is to propose a method and means of communication with sensors of a detection device, in particular for leakage detection, in zones with a dangerous atmosphere, without however limiting the length of the detection devices.

It is also a purpose of the invention to propose a method and means of communication with sensors of a detection device, in particular for leakage detection, limiting the energy consumed during the operations of communication with the sensors.

Finally another purpose of the invention is to propose a method and means of communication with sensors of a detection device, in particular for leakage detection, limiting the energy released by the detection device.

SUMMARY

The invention makes it possible to achieve the abovementioned purposes with a communication module or interface for a sensor, provided to be used in a detection device, in particular for leakage detection, comprising a plurality of sensors, characterized in that it comprises:

at least one means, referred to as upstream, for receiving an interrogation signal from upstream of said sensor and transporting it to the sensor, and receiving from said sensor a response signal and transporting it to upstream of the sensor;

at least one means, referred to as downstream, for transporting an interrogation signal to downstream of said sensor, at least one means, referred to as sensor short-circuit means, displaceable between an open position in which the upstream means is linked to the sensor, and a closed position in which the upstream means is disconnected from the sensor and connected to the downstream means, at least one means, referred to as control means, for controlling said short-circuit means and arranged so as to maintain said short-circuit means:
in the open position until the emission of the response signal,
in the closed position after said emission.

Thus, the communication module according to the invention makes it possible to carry out a communication with a sensor in order to interrogate it on its state or on a measured variable and to disconnect it from the communication wire(s) after the communication. The sensor thus disconnected is then in a standby state in which it no longer processes any communication signal since it is disconnected from the communication wire(s). Such a sensor in standby state consumes very little energy and consequently releases very little energy through the Joule effect.

Such a communication module according to the invention makes it possible, within the framework of a detection device comprising a plurality of sensors, arranged in series on one or more communication wire(s), to communicate with each of the modules individually and in turn and to have, at a given time t, one single active sensor, the other sensors being put into standby mode and disconnected from the communication wire. Having one single active sensor at a given time makes it possible to limit the energy released through the Joule effect during the communication operations within the framework of a detection device comprising several sensors compared with a configuration in which all the sensors process a communication signal in order to determine whether or not they are affected by the communication signal.

The module according to the invention therefore makes it possible, during the communication operations, to reduce the energy consumed by the sensors of a detection device and consequently the energy released through the Joule effect by the sensors. This reduction in energy makes it possible to design longer detection devices, covering a greater detection distance, and also comprising more sensors.

Such a communication module is particularly suited to a use in zones classed as ATEX, in order to communicate with the sensors of a detection device without having to limit either the length or the number of sensors of a detection device.

In fields not affected by the ATEX restrictions and for different types of sensors, it has been proposed to connect several addressable sensors in series. For example, the document DE 19959710 A1 describes a system in which a wire serves such sensors and distributes a clock signal to them, and another wire serves them in order to receive their response signal.

With respect to this document, it may be noted that the invention proposes to use, for each sensor, the same wire both for receiving the interrogation signal and transmitting it to the next sensor downstream, and both for emitting the response signal and transmitting a response signal received from the next sensor situated downstream.

Although it represents constraints in the scheduling of the signals and requires more complex electronics, this difference makes it possible to reduce the number of channels passing through the bus, and therefore the number of channels to be protected vis-à-vis the ATEX requirements.

In a particularly advantageous version of the invention, the communication module according to the invention can also comprise at least one means, referred to as repeater means, for receiving the interrogation signal received on the upstream means, and re-transmitting it on the downstream means.

The repeater module can optionally store the interrogation signal to be re-transmitted In this version, the communication module or interface makes it possible to still further reduce the energy consumed, and consequently the energy released through the Joule effect, with a detection device comprising a plurality of sensors. In fact, the communication module makes it possible to progressively re-transmit an interrogation signal, from one sensor to another adjacent sensor, up to the last sensor without having to re-transmit the interrogation signal from a remote communication unit or circuit. Thus, the level of energy of the interrogation signal can be reduced and calculated as a function of the greatest distance separating two adjacent sensors.

The module according to the invention can advantageously comprise at least one means of amplification of an interrogation signal received on the upstream means.

Thus, when the interrogation signal received is too weak, the amplification makes it possible to transmit an interrogation signal to the sensor that is sufficiently clear for it to be able to understand it and process it without having to request receiving the interrogation signal once again. Such an amplification makes it possible to avoid the uncertainties that can weaken the interrogation signal.

Moreover, when the communication module comprises a repeater means as described above, the amplification of the interrogation signal is carried out before the re-transmission of this interrogation signal on the downstream means. Thus, the communication module according to the invention makes it possible to ensure that the interrogation signal received by a subsequent communication module or a subsequent sensor sufficiently clear. In this case, the level of amplification may depend on the distance that the re-transmitted interrogation signal must cover in order to reach a subsequent communication module or subsequent sensor to which the interrogation signal is re-transmitted.

When the communication module comprises a repeater means as described above, the means of amplification can be incorporated in the repeater means or with the repeater means in a single module.

The at least one short-circuit means can comprise at least one single-throw switch.

The at least one means of controlling the at least one short-circuit means can comprise a timer.

The timer can be triggered by the reception of the interrogation signal for example.

The timer can moreover be arranged in order to:
maintain the short-circuit means in the closed position for a predetermined period greater than or equal to that of the interrogation of the assembly of the sensors arranged downstream,
then reposition the short-circuit means in the open position, and
await the reception of a new interrogation signal.

In a preferred embodiment version the communication module according to the invention can be produced incorporated in a processor or a microcontroller.

According to another aspect of the invention, a communication circuit or network with a plurality of sensors is proposed, in particular with the sensors of a detection device, in particular for leakage detection, said communication circuit or network comprising:
a communication module or interface according to the invention for each sensor of said plurality of sensors, and
at least one wire, referred to as a communication wire, provided in order to link said communication modules or interfaces in series.

Such a communication circuit according to the invention allows the interrogation in turn of each of the sensors, while consuming and releasing less energy than the existing communication circuits with the sensors of a detection device.

Such a communication circuit produces a low-energy communication bus, suited to use in zones classed as ATEX without having to limit either the length or the number of sensors of a detection device.

The communication circuit according to the invention can also comprise at least one termination means, for example a resistance equal to the resistance of a sensor, linked to the communication wire downstream of the last sensor.

Such a termination means makes it possible to terminate a process of interrogation of the sensors, simply and inexpensively.

According to another aspect of the invention, a sensor is proposed for detecting an event, such as a leakage, or for measuring a physical variable comprising:
at least one sensor means or sensing strip for monitoring an event or a physical variable, and
a communication module or interface with a sensor according to the invention.

The sensor according to the invention makes it possible to carry out a communication with a communication unit or circuit while consuming less energy and dissipating less energy compared with the existing sensors.

The sensor according to the invention can also comprise at least one electronic management module of said at least one sensor means, for example an electronic module producing an interface with the sensor means during an operation of interrogation of the state of the sensor. In this case, the communication module can be incorporated in the management module.

In an embodiment example, the sensor means can be arranged in/around a cable, referred to as a detection cable, said detection cable also comprising at least two wires supplying the sensor, extending over the entire length of the detection cable.

In the case of leakage detection, the sensor can comprise a detection cable. The sensor means is one or more conductive wires used for measuring an impedance which varies depending on the existence or otherwise of a leakage. In this case, the detection wire(s) is(are) arranged in/around the detection cable and substantially over the entire length of the detection cable.

In a preferred version, the detection cable can also comprise, at one end, the electronic management module and, at the other end, a module, referred to as a continuity module, said electronic management module, and said continuity module respectively, being provided in order to be assembled, advantageously detachably, with an electronic continuity module, and a management module respectively, of another sensor, in particular of an identical sensor, so as to produce:

- a connection in series between the at least one communication wire of said sensor and at least one communication wire of said other sensor, and
- a connection, in series or in parallel, between the wires supplying said sensor and the wires supplying said other sensor.

Thus, it is possible to modify at will the detection distance and therefore the length of the detection device, by detachably assembling several leakage sensors until the desired length is obtained.

According to another aspect of the invention, a detection device or network, in particular for leakage detection, is proposed comprising:

- a plurality of sensors according to the invention linked to one another, in series, by at least one communication wire, or
- a plurality of sensors and a communication circuit according to the invention linking said sensors in series.

The device according to the invention also comprises a communication unit or circuit for interrogating the sensors of the detection device, and a power supply unit for supplying, in series or in parallel, each of the sensors of the detection device as well as the communication modules or circuit.

If the sensors do not comprise any communication wire(s), or supply wires respectively, in this case the system also comprises this(these) wire(s) connected to the communication unit or circuit, or to the supply unit respectively.

Advantageously, the device according to the invention can also comprise a device, referred to as a barrier device, provided for limitation of the electric power/energy emitted in the direction of the sensors and arranged between said supply and communication units, and said sensors.

Such a barrier device can be a well-known Zener barrier.

According to yet another aspect of the invention, a method of communication between a communication unit or circuit and sensors is proposed, said communication unit and said sensors being arranged in series, said method comprising a step of transmission of a signal, referred to as an interrogation signal, from said communication unit or circuit to the sensor, referred to as the first sensor, closest to said communication unit, and an iteration of a phase, referred to as the interrogation phase, carried out by each sensor in turn, commencing with the first sensor and comprising the following steps:

- transmission, to the communication unit or circuit, of a signal of response to said interrogation signal,
- short-circuiting of said sensor so that the communication unit or circuit is linked to the next sensor without passing through said sensor.

The communication phase can also comprise a step of re-transmission, by the sensor, of said interrogation signal to the next sensor, each of the sensors apart from the first sensor thus receiving the interrogation signal from the preceding sensor. Such a re-transmission of the interrogation signal by each sensor to the next sensor makes it possible to reduce the level of power of the interrogation signal compared with the case where the interrogation signal is emitted by the communication unit for each sensor.

The interrogation phase can also comprise a step of storage of the interrogation signal received by the sensor before the step of re-transmission.

The short-circuiting of a sensor can be carried out for a predetermined time greater than or equal to the interrogation period of all the sensors. The sensor can then be reconnected to the communication wire in order to produce or be ready to produce a new communication phase.

The communication phase can also comprise an amplification of the interrogation signal received. When the communication phase comprises storage of the interrogation signal, the amplification can be carried out after storage of the signal, just before or during the re-transmission of the interrogation signal.

The method according to the invention is particularly suitable for communicating with liquid leakage detection sensors in zones with an explosive atmosphere as it makes it possible to reduce the electric power/energy used/dissipated by the leakage detection sensors.

BRIEF DESCRIPTION OF THE DRAWINGS

Other advantages and features will become apparent on examination of the detailed description of three examples that are in no way limitative, and the attached drawings, in which.

DETAILED DESCRIPTION

It is understood that the embodiments which will be described below are in no way limitative. It is possible in particular to imagine variants of the invention comprising only a selection of features described below in isolation from the other features described, if this selection of features is sufficient to confer a technical advantage or to differentiate the invention with respect to the state of the prior art. This selection comprises at least one feature, preferably functional without structural details, or with only a part of the structural details if this part alone is sufficient to provide a technical advantage or to distinguish the invention from the prior art.

In particular all the variants and all the embodiments described can be combined with one another if there is no technical objection to this combination.

In the figures, the elements common to several figures retain the same reference numbers.

Figure 1:
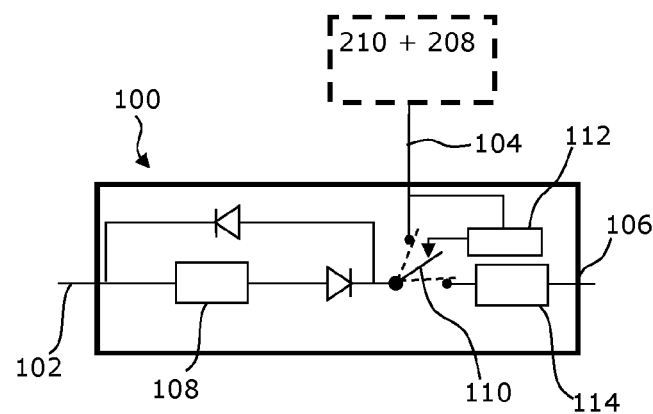
FIG. 1 is a diagrammatic representation of a communication module according to the invention.

FIG. 1 is a diagrammatic representation of a communication module according to the invention.

The communication module or interface 100 shown in FIG. 1 comprises a port 102, referred to as upstream, for receiving an interrogation signal, a port 104 for transmitting the interrogation signal to a sensor, represented by the dotted rectangle in FIG. 1. Furthermore, the response signal provided by the sensor is transmitted through the port 104 to the upstream port. Thus, the ports 102 and 104 make it possible to both receive the interrogation signal in a first direction of communication (from the port 102 to the port 104) and to transmit a response signal in the opposite direction (from the port 104 to the port 102).

The communication module 100 also comprises a port 106, referred to as downstream, for transmitting a signal to downstream of the communication module 100, for example to a sensor arranged downstream of the communication module and in series on a communication wire.

The communication module 100 also comprises a means 108, referred to as a repeater means, arranged on the upstream port 102 for receiving an interrogation signal from upstream of the communication module, optionally storing it, and re-transmitting it to downstream of the communication module 100, namely to the downstream port 106.

The module 100 also comprises a switch 110 which makes it possible to link the upstream port 102 either to the communication port 104, in a position, referred to as the open position, or to the downstream port 106 in a position, referred to as the closed position, in this closed position in which the upstream port 102 is linked to the downstream port 106, the communication port 104 is short-circuited, i.e. it is not linked to the remainder of the communication module 100 and is disconnected from the remainder of the communication module 100.

The communication module 100 also comprises a means 112 for controlling the position of the switch 110 in order to arrange it either in the open position, or in the closed position. The control means 112 comprises, in the present example, one or more timers. On reception of the interrogation signal a timer makes it possible to carry out a first countdown, of a duration greater than or equal to the duration of the sensor's response. As soon as the first countdown is completed, the switch 110 is arranged in the closed position, and a second countdown is carried out by the timer, with a duration greater than or equal to the duration of the response of the assembly of the sensors arranged downstream of the communication module 100. As soon as the second countdown is completed, the switch 110 is again arranged in the open position.

Alternatively, the control means can be arranged in order to detect the interrogation signal and/or the response signal emitted by the sensor and consequently to modify the position of the switch.

In the example shown in FIG. 1, the control means 112 is linked to the communication port 104 with the sensor. Alternatively, the control means 112 can be linked to the upstream port 102 or to the downstream port 106.

In the example shown in FIG. 1, the repeater means 108 re-transmits the interrogation signal as soon as the switch 110 passes into the closed position.

Optionally, the communication module 100 can also comprise an amplifier 114 for amplifying the interrogation signal. In the example shown in FIG. 1, the amplifier means 114 is arranged on the downstream port 106 downstream of the switch 110.

In a preferred embodiment version the communication module 100 can be produced incorporated in a processor or a microcontroller.

Figure 2:
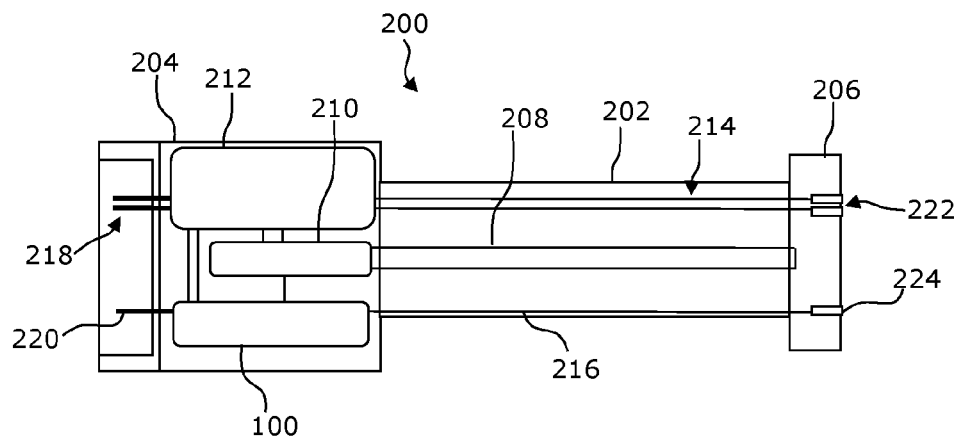
FIG. 2 is a diagrammatic representation of a sensor, in particular of a leakage detection sensor according to the invention comprising the communication module of FIG. 1.

FIG. 2 is a diagrammatic representation of a sensor, in particular of a detection sensor according to the invention, and more particularly a leakage detection sensor of a liquid such as water or a hydrocarbon, comprising the communication module 100 of FIG. 1.

The sensor 200 of FIG. 2 comprises a detection cable 202 comprising at one end, referred to as upstream, a connector 204, referred to as upstream, and at the other end, referred to as downstream, a connector 206, referred to as downstream.

The sensor 200 also comprises a sensor means or sensing strip 208 arranged in/around the cable 202 and which in the case of the liquid leakage detection comprises one or more liquid leakage detection wires.

The sensor 200 also comprises an electronic module 210 for management or interrogation of the sensor means 208 linked to the communication module 100 and both arranged in the upstream connector 204.

For example, in the case of the detection of electrically conductive liquid leakage, the sensor means 208 can comprise two electrically conductive wires, isolated from one another, and the management module 210 can comprise an ohmmeter for measuring the resistance between these two wires. When the resistance measured is greater than a predetermined value, then no leakage is detected, if not, leakage is detected. The extent of the leakage can also be determined as a function of the measured resistance value: the greater the leakage the lower the measured resistance. Of course, this architecture is only given by way of example and is in no way limitative.

The management module 210 receives the interrogation signal from the communication module 100, then interrogates the sensor means 208 or carries out one or more measurements of physical or electric variables by means of the sensor means 208 and determines the response signal. Then, the response signal is transmitted to the communication module 100.

The sensor 200 also comprises a supply module 212 arranged in the upstream connector 204. The supply module 212 receives a signal to supply electricity and supplies the management module 210 and the communication module 100.

The sensor means 208 is arranged in/around the cable 202 substantially over the entire length of the cable 202. For example, the sensor means 208 can be spiraled around the central core of the detection cable.

The upstream connector 204, respectively the downstream connector 206, is provided to be connected, detachably or not, preferably detachably, to a downstream connector 206, or to an upstream connector 204 respectively, of another sensor so as to produce a detection device of variable and modular length.

The sensor 200 also comprises two supply wires denoted 214, arranged in/around the detection cable 202, and transporting a supply signal between the upstream and downstream connectors 204, 206.

The sensor 200 also comprises a communication wire 216, arranged in/around the detection cable 202, and transporting a communication signal between the upstream and downstream connectors 204, 206.

The upstream connector 204 comprises:
 two connection ports 218, for example male, linked to the supply module and provided for receiving/transmitting a signal to supply electricity; and
 a connection port 220, for example male, linked to the communication module and provided for receiving or transmitting a communication signal.

The downstream connector 206 comprises:
- two connection ports 222, for example female, linked to the supply wires 214 and provided for receiving/transmitting a signal to supply electricity; and
- a connection port 224, for example female, linked to the communication module and provided for receiving or transmitting a communication signal.

The upstream connector 204, or the downstream connector 206 respectively, is designed to be connected to a downstream connector 206, or an upstream connector 204 respectively, of another sensor so as to produce:
- an electrical connection transporting a supply signal via the ports 218, or 222 respectively, and
- an electrical connection transporting a communication signal via the port 220, or 224 respectively.

Thus, it is possible using the sensor 200 to produce, at will, a modular leakage detection device of variable length, simply by connecting or disconnecting the sensors and without having to also manage additional connections for the supply of the sensors or communication with the sensors. Simply connecting one sensor to another via the upstream and downstream connectors makes it possible to transport the supply signal and the communication signal.

The upstream connector 204, or downstream connector 206 respectively, can also comprise means (not shown) for guiding and holding a downstream connector 206, or upstream connector 204 respectively, for facilitating the assembly of the connectors with each other and for ensuring that the connection is held after assembly. Such means can comprise a screw thread, tapping, clips, a guide rail etc.

Figure 3:
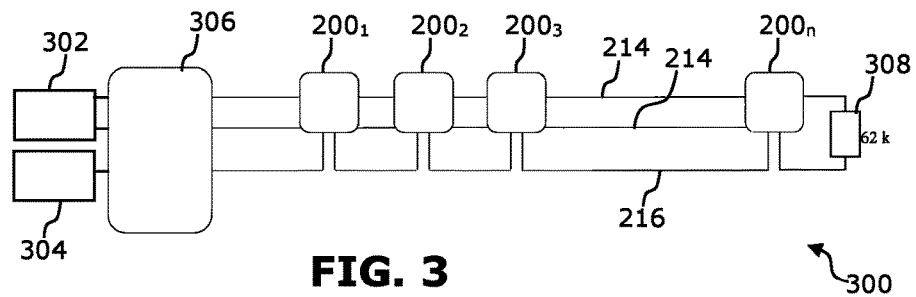
FIG. 3 is a diagrammatic representation of a detection device, in particular for leakage detection, according to the invention comprising a plurality of sensors of FIG. 2.

FIG. 3 is a diagrammatic representation of a detection device or network, in particular for leakage detection, according to the invention comprising a plurality of sensors of FIG. 2.

The device 300 comprises a power supply unit 302 and a communication unit or circuit 304 and n sensors $200_1$, $200_2$, $200_3$, ..., $200_n$ such as the sensor 200 described in FIG. 2. The supply unit supplies each of the sensors 200 with a supply signal transported from sensor to sensor by the wires 214 and the communication unit communicates with each of the sensors 200 in turn via the communication wire 216.

In order to facilitate understanding of the connection between the sensors 200, the supply wires 214 and the communication wire 216 have been shown distinctly, outside the sensors 200.

With regard to the communication wire 216, the sensors $200_i$ are connected in series to the communication wire 216. With regard to the supply the sensors 200 can be connected in series or in parallel to the supply wires 214.

The leakage detection device 300 also comprises a Zener barrier 306 arranged between on the one hand the sensors 200 and on the other hand the supply unit 302 and the communication unit 304. This Zener barrier 306 makes it possible to limit the power or the energy transmitted from the supply and communication units to the sensors 200.

The device 300 also comprises a termination means 308 connected to the last sensor $200_n$, which in the present example is a resistor, for example of value 62 kΩ. The termination means 308 is connected on the one hand to the connector downstream of the last sensor $200_n$ and on the other hand to one of the supply wires in order to ensure correct termination of a communication process.

Figure 4:
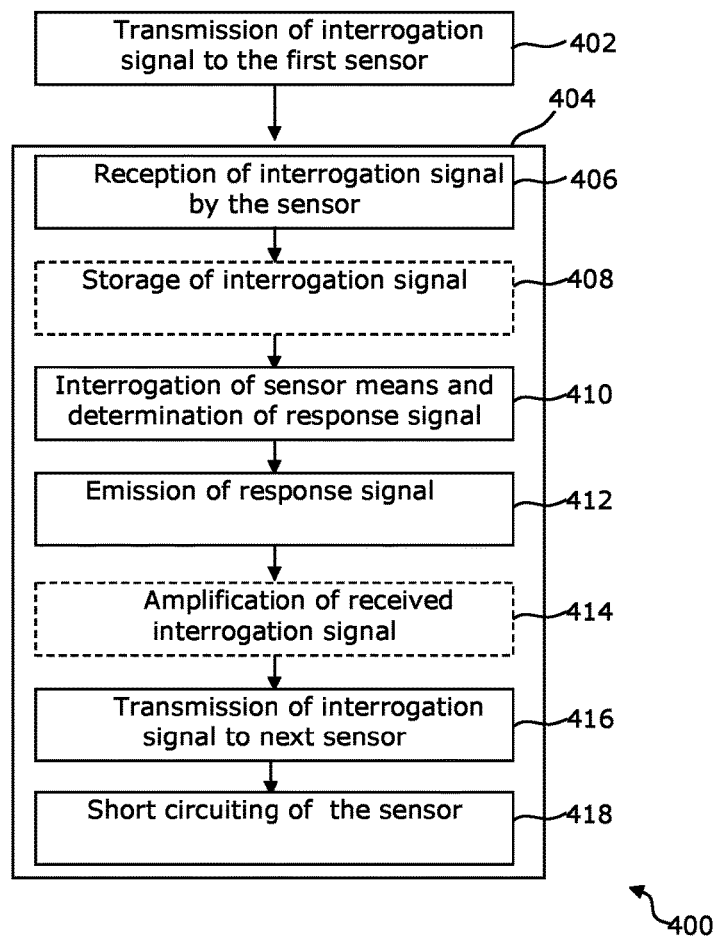
FIG. 4 is a diagrammatic representation of a method of communication with the sensors of a detection device according to the invention.

FIG. 4 is a diagrammatic representation of a method of communication with the sensors of a detection device according to the invention, for example the device 300 of FIG. 3.

The method 400 comprises a step 402 of transmission of an interrogation signal from a communication unit, the unit 304 in the example of FIG. 3, to the first sensor situated on the communication wire, the sensor $200_1$ in the example of FIG. 3.

The method 400 then comprises a phase 404, referred to as the interrogation phase, carried out by each of the sensors one after the other, in turn, commencing with the first sensor, the sensor $200_1$ in the example of FIG. 3.

This interrogation phase 404 comprises a step 406 of reception of an interrogation signal by the sensor, for example the sensor $200_i$, with i=1 to n, from upstream of the sensor via a communication wire, for example the communication wire 216.

During an optional step 408, the interrogation signal is stored in storage means in the sensor.

Then, the sensor means is interrogated in accordance with the interrogation signal in order to determine a response signal in step 410.

The response signal is transmitted to upstream of the sensor in step 412, i.e. to the control unit, on the same communication wire or on another communication wire, in any case in the opposite direction to the direction of propagation of the interrogation signal.

During an optional step 414, the interrogation signal previously received is amplified at the sensor.

In step 416, the interrogation signal, optionally amplified, is transmitted by the sensor to the next sensor, for example the sensor $200_{i+1}$, i.e. the sensor situated downstream of the sensor with respect to the communication unit, on the same communication wire.

In step 418, the sensor is short-circuited with respect to the communication wire, i.e. it is disconnected from the communication wire. Depending on the architecture selected for the communication module, or for the sensor, this step 418 can be carried out before step 416.

Figure 5:
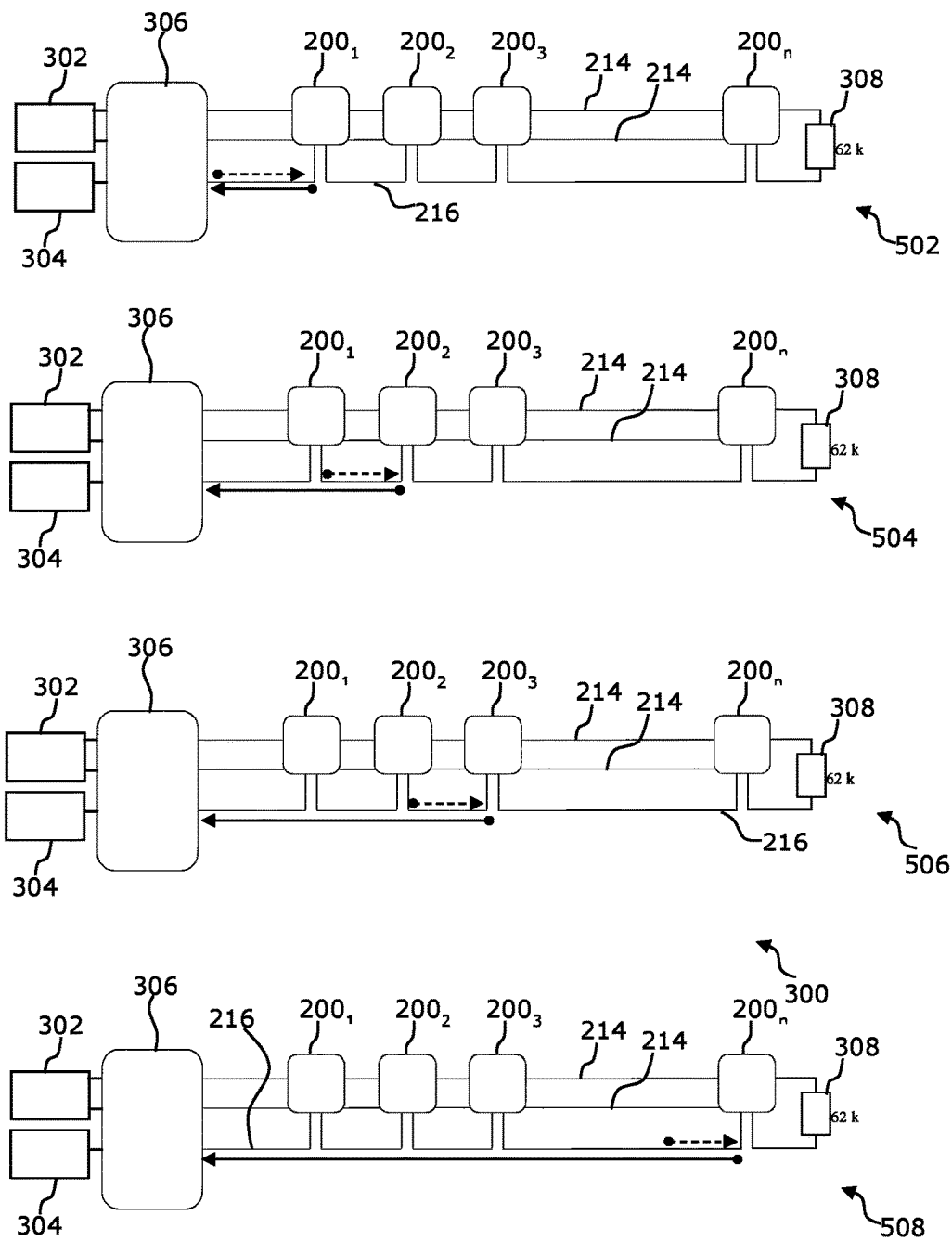
FIG. 5 is a diagrammatic representation of the signals exchanged during the method of FIG. 4 in the configuration of the device of FIG. 3.

FIG. 5 is a diagrammatic representation of the signals exchanged during the method of FIG. 4 in the configuration of the device of FIG. 3.

In FIG. 5, a dotted arrow represents an interrogation signal and a solid arrow represents a response signal. Each arrow shows the starting point of the signal, the arrival point and the direction of propagation of the signal in question.

For each sensor $200_i$, the interrogation signal and the response signal are propagated in two opposite directions on one and the same communication wire: the response signal is propagated in the direction of the sensor $200_i$ to the communication unit 304 and the interrogation signal is propagated in the opposite direction.

The configuration 502 represents the case where the first sensor $200_1$ receives the interrogation signal from the communication unit 304 and responds to the communication unit 304.

The configuration 504 represents the case where the second sensor $200_2$ receives the interrogation signal from the first sensor $200_1$ and responds to the communication unit 304.

The configuration 506 represents the case where the third sensor $200_3$ receives the interrogation signal from the second sensor $200_2$ and responds to the communication unit 304.

The configuration 508 represents the case where the sensor $200_n$ ranked n receives the interrogation signal from the (n−1)th sensor $200_{n-1}$ and responds to the communication unit 304.

Generally:
each sensor $200_i$, with i=2 to n, receives the interrogation signal from the preceding sensor $200_{i-1}$, and each sensor $200_i$, with i=1 to n−1, sends the interrogation signal to the next sensor $200_{i+1}$; and each sensor responds to the communication unit.

The response signal and/or the interrogation signal can be an analogue signal or a digital signal.

For example, the interrogation signal can be a pulse with a constant level, the width or the number of which differs depending on the information requested at the sensor.

The response signal can be a digital signal, for example a 12-bit message in which:

the first two bits signal the start of the message, the last bit signals the end of the message, and the other nine bits represent the content of the message.

Of course the invention is not limited to the examples which have just been described.

The invention claimed is:

1. A communication interface, at least partially enclosed, for a sensor which includes a sensing strip, provided to be used in a detection device, in particular for leakage detection in an explosive atmosphere, having a plurality of sensors, comprising:

at least one upstream communication port, configured for receiving an interrogation signal from upstream of said sensor and transporting it to the sensing strip, and receiving from said sensing strip a response signal and transporting it to upstream of the sensor;

at least one downstream communication port, configured for transporting an interrogation signal to downstream of said sensor;

at least one sensor short-circuit switch, displaceable between an open position in which the upstream communication port is linked to a port for communication with the sensing strip of the sensor, and a closed position in which the upstream communication port is disconnected from said port for communication with the sensing strip of the sensor and connected to the downstream communication port;

at least one control circuit, configured for controlling said at least one short-circuit switch, which is arranged so as to maintain said short-circuit switch:

in the open position until emission of the response signal, thus making it possible:

in a first direction of communication, to receive the interrogation signal and forward said interrogation signal to the sensing strip of the sensor; and in the opposite direction, to emit a response signal provided by the sensing strip of the sensor, which is forwarded to the communication interface via the communication port and further upstream of the sensor; and in the closed position after said emission.

2. The interface of claim 1, wherein it also comprises at least one repeater circuit, configured for receiving the interrogation signal received on the upstream communication port and re-transmitting it on the downstream communication port.

3. The interface of claim 1, wherein it comprises at least one amplifier configured for amplification of an interrogation signal received on the upstream communication port.

4. The interface of claim 1, wherein the at least one short-circuit switch comprises a single-throw switch.

5. The interface of claim 1, wherein the at least one control circuit of the at least one short-circuit switch comprises a timer.

6. A communication network with a plurality of sensors, in particular with the sensors of a detection device, in particular for leakage detection, said communication network comprising:

a communication interface according to claim 1 for each sensor of said plurality of sensors, and at least one communication wire, provided to link said communication interfaces in series.

7. The network of claim 6, wherein it also comprises at least one termination device, linked to the communication wire downstream of the last sensor.

8. A detection composite cable, in particular for leakage detection, comprising:

a plurality of sensors and a communication network according to claim 6, linking said sensors in series;

a communication circuit for interrogating said sensors; and a power supply.

9. The composite cable of claim 8, further comprising a barrier device provided for limitation of electric power, arranged between said power supply and communication circuit and said sensors.

10. A sensor configured for detecting an event, such as a leakage, or for measuring a physical variable, comprising:

at least one sensing strip configured for monitoring an event or a physical variable, and a communication interface according to claim 1.

11. The sensor of claim 10, wherein it also comprises at least one electronic management circuit configured for managing said at least one sensing strip, and the communication interface is incorporated in the management circuit.

12. The sensor of claim 11, wherein the at least one sensing strip arranged in/around a detection cable, said detection cable also comprising at least one communication wire, and at least two wires for supplying the sensor, extending over the entire length of said detection cable.

13. The sensor of claim 12, wherein the detection cable comprises at one end the electronic management circuit and at the other end a continuity circuit, and wherein said electronic management circuit, and said continuity circuit respectively, is provided in order to be assembled with an electronic continuity circuit, and a management circuit respectively, of another sensor so as to produce:

a connection in series between the at least one communication wire of said sensor and at least one communication wire of said other sensor, and a connection, in series or in parallel, between the wires for supplying said sensor and the wires for supplying said other sensor.

14. A detection composite cable, in particular for leakage detection, comprising:

a plurality of sensors according to claim 10, linked to one another in series, by at least one communication wire;

a communication circuit for interrogating said sensors; and a power supply.

15. The composite cable of claim 14, further comprising a barrier device provided for limitation of electric power, arranged between said power supply and communication circuit and said sensors.

16. A method of communication between a communication unit and a plurality of sensors, wherein said communication unit and said sensors are arranged in series, and wherein said method comprises:
- a step of transmission of an interrogation signal from said communication unit to an upstream port of a first of said sensors, being the sensor closest to said communication unit; and
- an iteration of an interrogation phase, carried out by each of the plurality of sensors in turn, commencing with the first sensor and continuing with each subsequent sensor in a direction moving away from said communication unit, the subsequent sensor in each iteration being referred to as the interrogated sensor, said interrogation phase comprising the following sub-steps:
- transmission, by said interrogated sensor through said upstream port to the communication unit, of a signal of response to said interrogation signal;
- short-circuiting of said interrogated sensor so that the communication unit is then linked to the upstream port of the next sensor in a direction moving away from said communication unit without passing through said interrogated sensor.

17. The method of claim 16, wherein the interrogation phase also comprises a sub-step of re-transmission, by the interrogated sensor, of said interrogation signal to the next sensor, so that each of the plurality of sensors apart from the first sensor thus receives the interrogation signal from the preceding sensor.

\* \* \* \* \*